(12) United States Patent
Furukawa et al.

(10) Patent No.: US 6,454,057 B2
(45) Date of Patent: Sep. 24, 2002

(54) BRAKE CYLINDER

(75) Inventors: Masaaki Furukawa; Hiroo Nakagawa; Michiho Matsuura, all of Nagoya (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 09/917,718

(22) Filed: Jul. 31, 2001

(30) Foreign Application Priority Data

Aug. 1, 2000 (JP) ........................ 2000-233454

(51) Int. Cl.[7] ........................ F16D 65/56; F16D 65/24
(52) U.S. Cl. ................... 188/79.62; 188/79.51
(58) Field of Search ..................... 188/79.51, 79.61, 188/79.62, 196 BA, 196 D, 196 V, 352

(56) References Cited

U.S. PATENT DOCUMENTS

| | | | | | |
|---|---|---|---|---|---|
| 3,811,538 A | * | 5/1974 | Farr | ...................... | 188/196 D |
| 3,838,757 A | * | 10/1974 | Farr | ...................... | 188/196 D |
| 4,326,607 A | * | 4/1982 | Chuwman | ................ | 188/79.55 |
| 4,742,897 A | * | 5/1988 | Hiroshi et al. | .......... | 188/196 D |
| 4,792,021 A | * | 12/1988 | Fukuzawa et al. | ....... | 188/79.62 |
| 5,246,091 A | * | 9/1993 | Brooks, Sr. | ............. | 188/196 D |
| 5,713,437 A | * | 2/1998 | Furukawa et al. | .......... | 188/352 |

* cited by examiner

*Primary Examiner*—Christopher P. Schwartz
(74) *Attorney, Agent, or Firm*—Liniak, Berenato, Longacre & White

(57) ABSTRACT

A brake cylinder device with an effective adjustment bolt processing and with an improved air bleeding effect, wherein an adjustment bolt (40) as a component of an automatic shoe clearance adjustment mechanism, wherein an external thread stem (40*a*) makes an irreversible engagement with a piston (22), performing brake shoe expansion, and a brake fluid feeding groove (40*b*) is formed on a periphery of the external thread stem (40*a*) is designed to be spiral.

6 Claims, 8 Drawing Sheets

BRAKE CYLINDER

FIELD OF THE INVENTION

This invention relates to a brake cylinder employed such as in a drum brake device for a motor vehicle and more particularly relates to a brake cylinder including an automatic shoe clearance adjustment mechanism.

DESCRIPTION OF PRIOR ART

A conventional brake cylinder device including an automatic shoe clearance adjustment mechanism as disclosed in the Japanese Provisional Patent Publication No. 9-229115 is composed of a piston slidably installed in a cylinder bore formed in a cylinder body; an adjustment bolt, one side of which has a first external thread stem making a screw engagement with an internal thread formed in the piston preventing the rotation between the two threaded portions by an axial thrust while the other side of which has a clutch surface making a clutch engagement with a first clutch surface formed inside of the cylinder bore; a clutch ring, an axial portion of which has an internal thread making a screw engagement with a second external thread stem formed on the other side of the adjustment bolt with a backlash between the two allowing a rotation of the two threaded portions by an axial thrust and a periphery of which having a clutch surface making a clutch engagement with a second clutch surface inside of the cylinder bore; and a clutch spring energizing the clutch ring in the direction to make the clutch engagement with the second clutch surface inside of the cylinder bore, wherein a straight brake fluid feeding groove is formed on a periphery at one side of the adjustment bolt.

Hereafter, "screw engagement preventing the rotation between the two threaded portions by an axial thrust" may be called "irreversibly screw engagement", while "screw engagement allowing a rotation of the two threaded portions by an axial thrust" may be called "reversibly screw engagement".

A brake fluid feeding groove is explained next with reference to FIG. 8. The brake fluid feeding groove c on an adjustment bolt a is designed to be rectilinearly parallel in an axial direction of the adjustment bolt and to entirely cover a periphery of an external thread stem b on the adjustment bolt making a screw engagement with a piston d so as not to rotate the two threaded portions by an axial thrust. The brake fluid feeding groove c and the external thread stem b have been machined by either one of the following two processes. Firstly, the brake fluid feeding groove is machined by a milling machine, since then the external thread is machined by a lathe. Secondly, the external thread is machined by a lathe or a rolling machine, since then the brake fluid feeding groove is machined by the milling machine.

The adjustment bolt as a component of the aforementioned brake cylinder has the following drawbacks. If the brake fluid feeding groove c is machined by the milling machine prior to machining of the external thread, although there is no need to worry about a burr formed on a threaded portion, thread-cutting an external thread on the external thread stem b must be machined by another type of machine (lathe). Transporting and replacing of the work require more time and manpower, resulting in an increasing price of the adjustment bolt a.

If the brake fluid feeding groove c is machined by the milling machine on the heels of processing the external thread, there is some possibility of leaving a burr on the threaded portion even with a great care of the machining condition and the machining tools.

In order to avoid leaving any burr, the external thread is preferably processed prior to the brake fluid feeding groove c. However, since the brake fluid feeding groove c is designed to be rectilinearly parallel in an axial direction of the adjustment bolt a, a plastic deform processing by the rolling machine suitable for a mass production of the external thread becomes unstable in its rotation when rolling a half-finished work of the adjustment bolt a, thereby requiring a larger manufacturing tolerance. Accordingly, that kind of the processing is not appropriate for an adjustment bolt which needs to keep a deviation of backlash bellow.

A back chamber is formed between the piston d and a top of the adjustment bolt a. Brake fluid flows along the brake fluid feeding groove c and reaches to a bottom of the back chamber and rebounds toward a through duct formed at the center of the adjustment bolt a.

SUMMARY AND OBJECT OF THE INVENTION

This invention was made to remove the aforementioned drawbacks, and an object of this invention is to provide a brake cylinder device with an excellent processability and an excellent air bleeding.

A cylinder device of this invention has an automatic shoe clearance adjustment mechanism, comprising a piston slidably fit in a cylinder hole of a cylinder body. An adjustment bolt is provided, one end of which has an external thread irreversibly screwed into an internal thread formed in the piston while the other end of which has a clutch surface making a clutch engagement with a bottom surface of the cylinder hole facing the piston. A drive ring is provided having an internal thread formed at its axle portion reversibly fitting over an external thread axle formed at the other side of the adjustment bolt with a slight gap inbetween and having a peripheral clutch surface making a clutch engagement with the bottom surface of the cylinder hole; and a drive ring spring energizing the drive ring in the direction to make the clutch engagement, wherein a spiral brake fluid feeding feed groove is formed on and entirely covering a peripheral surface of the irreversible external thread axle at one side of the adjustment bolt. Accordingly, this invention provides an advantage in which the cost for manufacturing the adjustment bolt may be reduced and the effectiveness of the air bleeding may be improved.

According to one aspect of the invention, the brake fluid feeding groove on the adjustment bolt is formed by the same rolling or turning process of forming an external thread on the external thread axle. This invention provides another advantage in which processing to form the external thread stem on the adjustment bolt and the brake fluid feeding groove may be performed by the same processing machine.

Further, this invention provides a brake cylinder which is characterized in that the brake cylinder is a two-side open type being partitioned into two sections to compose a pair of right and left cylinder bores and has the automatic shoe clearance adjustment mechanism at one of the cylinder bore. Accordingly, this provides the same operation and the advantages as described above.

Further, this invention provides a brake cylinder which is characterized in that the brake cylinder is a one-side open type being partitioned into two sections to compose a cylinder bore and has the automatic shoe clearance adjustment mechanism therein. Accordingly, this provides the same operation and the advantages as described above.

Further, this invention provides a brake cylinder which is characterized in that the brake cylinder is a two-side open type being partitioned into two sections to compose a pair of right and left cylinder bores and has the automatic shoe clearance adjustment mechanism symmetrically provided at each cylinder bore.

DETAILED DESCRIPTION OF PREFERRED EMBODIMENTS

Embodiments of this invention are explained below with reference to the accompanied drawings. FIGS. 1–5 show a drum brake device having a both-side open type brake cylinder with respect to Example 1 of the invention.

Figure 1:
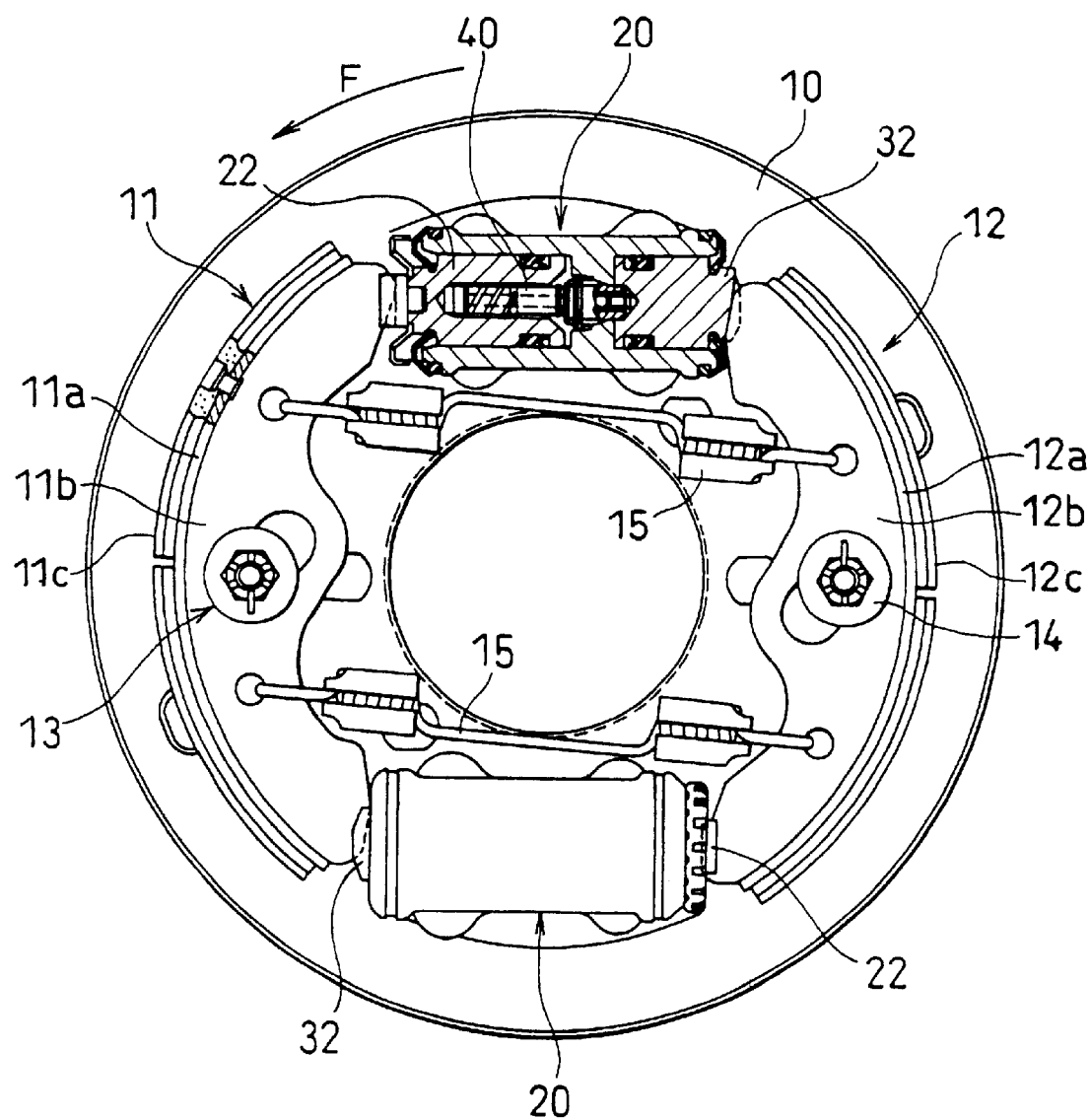
FIG. 1 is a plan view of a drum brake device employing a both-side-open type cylinder device in Example 1 of this invention.

FIG. 1 shows a duo-two leading (D2L) type drum brake device having both-side open type brake cylinder devices (hereafter cylinder device) 20, 20 with respect to Example 1 of the invention A back plate 10 is fixed on a stationary part such as a vehicle body. A pair of the cylinder devices 20, 20 are fixed on upper and lower sides of the back plate 10 in FIG. 1 such as by bolts, respectively. A pair of right and left brake shoes 11, 12 are structured such that arc-shaped shoe webs 11b, 12b are fixed on inner surfaces of shoe rims 11a, 12a to make a T-shape in a cross-section and linings 11c, 12c are fixed on peripheral surfaces of the shoe rims 11a, 12a. Intermediate sections of the pair of shoe webs 11b, 12b are movably supported by shoe hold mechanisms 13, 14, and surfaces of the linings 11c, 12c are aligned with a frictional surface of a brake drum with a predetermined clearance therebetween. Each adjacent upper and lower ends of the shoe webs 11b, 12b engages with right and left pistons of the cylinder devices 20, 20, respectively. A pair of shoe return springs 15, 15 are stretched between the shoe webs 11b, 12b.

The pair of cylinder devices 20, 20 in FIG. 1 are almost structurally same, where the drum brake appeared in FIG. 1 is rotated 180 degree relative to the center of the drum brake. An upper side of FIG. 1 is explained below with reference to FIG. 2.

Cylinder bores 21a, 21b are rectilinearly formed at both sides of the cylinder body 21, and a partition 21c exists between the two bores 21a, 21b so that two bores 21a, 21b have bottoms. Ducts for brake fluid inlet and outlet are drilled into a fluid chamber 20a located at the bottom side of one cylinder bore 21a, which enables to supply and exhaust the brake fluid between the fluid chamber 20a and a brake master cylinder. Around the cylinder axis at the partition 21c, a through hole 21d is extended from right to left in FIG. 2 and is gradually widened with steps, a first conical surface 21e and a second conical surface 21f are formed on an internal surface of the through hole.

Figure 2:
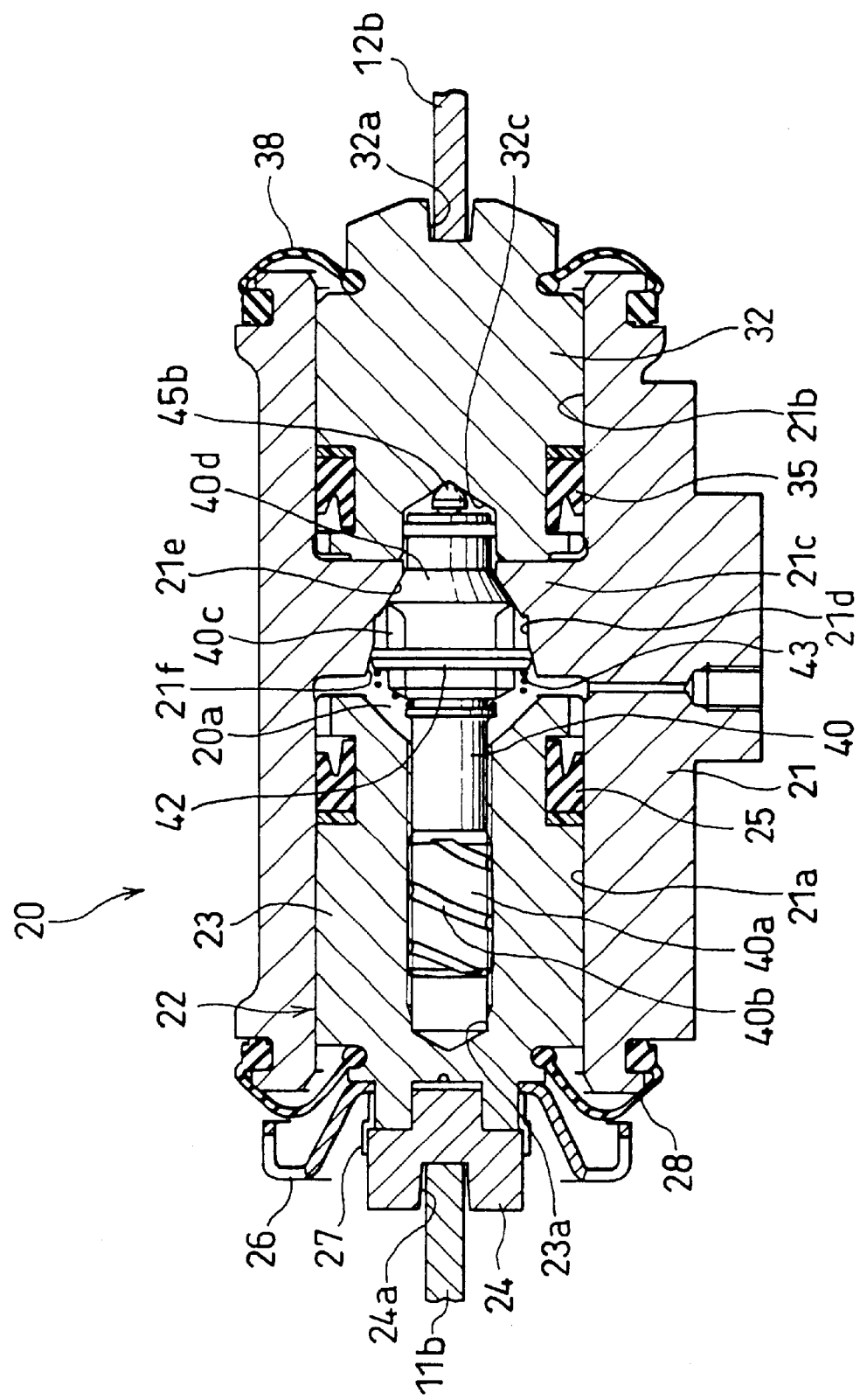
FIG. 2 is a cross-section view of a cylinder device of this invention.

A first piston 22 at the left side of FIG. 2 comprises the piston body 23 and a piston head 24, both member rotatably fits with relative to each other. The piston body 23, on the periphery of which the piston cup 25 fits, slidably fits in one cylinder bore 21a. A toothed wheel 26 for a manual shoe clearance adjustment is fit with the piston body 23 at the left side so as not to be rotatable relative to each other. A clip 27 holds a connecting portion between the piston body 23 and the piston head 24 to practically integrate the piston body 23 and the piston head 24, which may be disassembled later. A hollow 23a is drilled from the right side of the axis of the piston body 23, which has an internal thread, which makes an irreversibly screw engagement with a corresponding external thread, therein. A shoe engagement groove 24a is formed at the left end of the piston head 24, and a shoe web 11b of one brake shoe 11 engages with the groove 24a so as to restrict a rotation of the piston head 24. A dust boot 28 is installed between the piston body 23 and the cylinder body 21, and covers an opening of one cylinder bore 21a for dust-proof and waterproof.

The second piston 32, on the periphery of which an external piston cup 35 fits, slidably fits on the other cylinder bore 21b at the right side of the FIG. 2. A shoe engagement groove 32a is formed at the right side of the second piston 32 while a hollow 32c is drilled at the left side. The shoe web 12b of the other brake shoe 12 engages with the shoe engagement groove 32a. A dust boot 38 is also installed between the second piston 32 and the cylinder body 21.

Components of the automatic shoe clearance adjustment mechanism are explained next with reference to FIGS. 2–5.

A first external thread, which makes an irreversibly screw engagement with a corresponding internal thread, is formed on one side (left side in FIGS. 2 and 3) of the adjustment bolt 40, and a spiral brake fluid feeding groove 40b is formed continuously on and entirely covering a periphery of the external thread stem 40a. The external thread stem 40a makes an irreversible screw engagement with the internal thread formed in the hollow 23a of the piston body 23.

An O-ring 41 covers around the other side (right side of FIG. 2 and 3) of the adjustment bolt 40, and the O-ring 41 resiliently contacts and fits with the hollow 32c of the second piston 32. Further, a second external thread, which makes a reversibly screw engagement with a corresponding internal thread, is constructed on a large diameter section on the other side of the adjustment bolt 40. A conical surface 40d formed adjacent to the external thread stem 40c makes a clutch engagement with a first conical surface 21e of the cylinder body 21. A through duct 40e exists at an axial portion of the adjustment bolt 40, and a through duct 40f exists at the axial portion of the other side of the adjustment bolt 40 crossing the through duct 40e. A flat clutch ring 42 has an internal thread, which makes a reversibly screw engagement with a corresponding external thread at its axial portion and a conical surface 42a at its peripheral surface. This internal thread makes a reversibly screw engagement with the external thread stem 40c of the adjustment bolt 40 with a predetermined axial backlash.

The conical surface 42a makes a clutch engagement with the second conical surface 21f on the cylinder body 21 by a clutch spring 43 provided between the adjustment bolt 40 and a flange 40g.

A coil spring 44 is compressed in a predetermined position at the right side of the through duct 40e at the axial portion of the adjustment bolt 40. An axial section 45a of a locator 45 is inserted to fit with the right side of the coil spring 44, and the top 45b of the locator 45 sits on a bottom surface of the hollow 32c of the second piston 32. The function of the coil spring 44, the locator 45, and the O-ring 41 is to prevent a blind movement when the clutch engagement of the conical surface 40d of the adjustment bolt 40 during the brake operation and the adjustment bolt 40 is vibrated. Therefore, the coil spring 44, the locator 45, and the O-ring 41 are selected when necessary and are not requirement parts of the invention.

Figure 3:
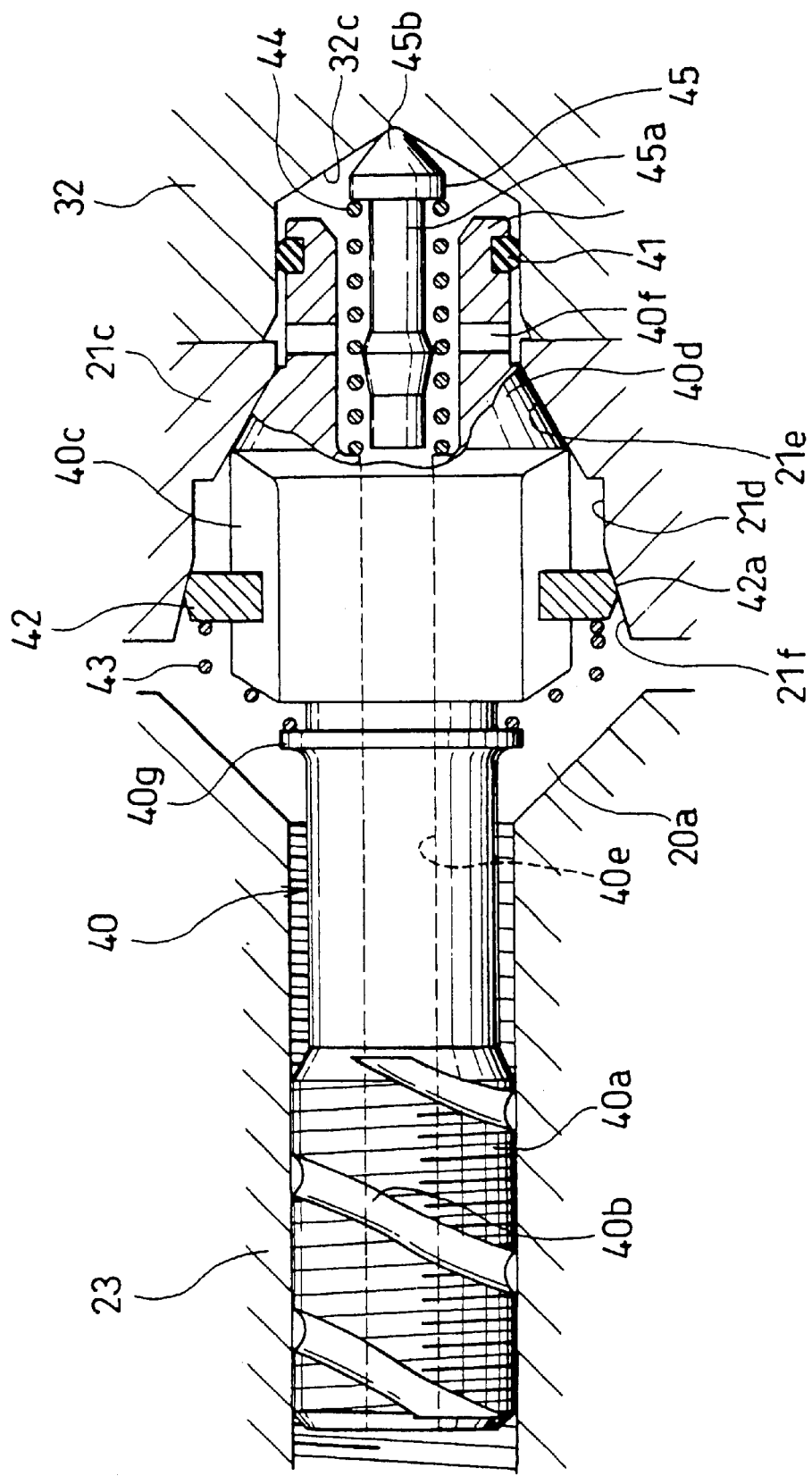
FIG. 3 is an enlarged cross-section view of an automatic shoe clearance adjustment mechanism of this invention.
Figure 4:
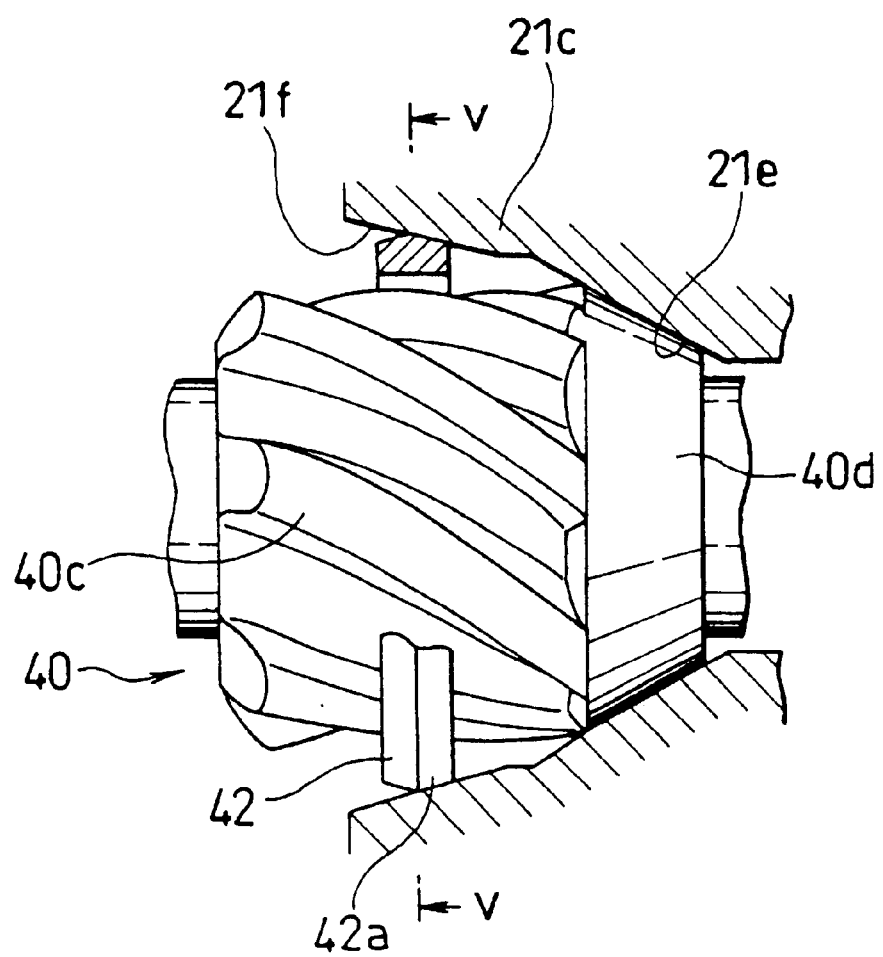
FIG. 4 is a partial view in FIG. 3, particularly illustrating screwing portion which is designed so as to rotate by an axial thrust between an internal and an external threads.
Figure 5:
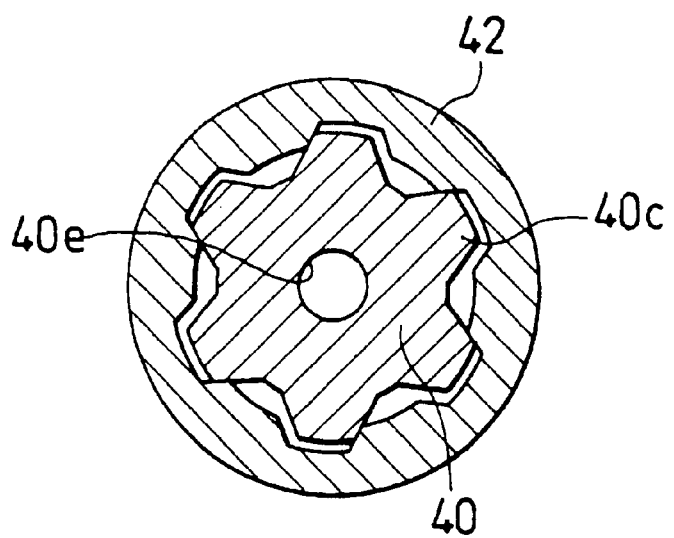
FIG. 5 is a cross-section view of a cylinder device taken along the line V—V in FIG. 4.

As shown in FIG. 3, a spiral brake fluid feeding groove 40b is formed on and continuously entirely covering a peripheral surface of the external thread stem 40a at one side of the adjustment bolt 40.

The spiral feeding groove 40b is deeper than a bottom of the external thread stem 40a so as to realize efficient feeding of the brake fluid, and a pitch of the feeding groove 40b is wider than that of external thread. A spiral direction of the feeding groove 40b may be either the same as or opposite to that of the external thread.

Forming the brake fluid feeding groove 40b may be performed by the same widely known processing device as used to form the external thread, e.g. the lathe, prior to the processing of the external thread. Therefore the brake fluid feeding groove 40b may be formed without unwanted burrs on the external thread portion.

For mass production, a half-finished work of the adjustment bolt 40, after performing the plastic deform process of the brake fluid feeding groove 40b by the rolling machine, is automatically fed in a thread rolling machine, and the plastic deform process is performed on the external thread just like forming the feeding groove 40b, which further increases the productivity, if this thread rolling process is employed. Since the half-finished work of the adjustment bolt 40 is to be stabilized during the rolling process, the pitch of the feeding groove 40b is preferably large. However, the machining process of the feeding groove 40b with a larger pitch may be performed while the rolling process of the external thread with a smaller pitch may be performed, which has proven to increase the productivity comparing to the traditional process of utilizing the lathe. For small number of production, it is noted that both the feeding groove 40b and the external thread may be machined by the lathe.

Brake operation and shoe clearance adjustment operation are explained next with reference to FIGS. 1–3. The shoe clearance adjustment operation of both cylinder devices 20 and 20 may be identical, and therefore the explanation will be made only as to one of the cylinder devices 20, 20.

In FIG. 1, since both cylinder devices 20 and 20 are connected by a brake pipe (not shown in FIG. 1), feeding the brake fluid into the fluid chamber 20a at the bottom side of the cylinder bore 21a presses both upper and lower adjacent ends of the brake shoes 11, 12 to spread open against a force of shoe return springs 15, 15 resulting in making a frictional engagement between linings 11c, 12c and a brake drum (not shown in FIG. 1).

If the brake drum is rotating in a direction of arrow F in FIG. 1, the second pistons 32, 32 function as anchors while if the brake drum is rotating in an opposite direction of arrow F, the adjustment bolts 40, 40 function as anchors via the first pistons 22, 22 (only one of which is shown in FIG. 1). At this time, both brake shoes 11, 12 have self-servo effect regardless of a rotational direction of the brake drum, thereby operating as a duo-two-leading (D2L) type brake.

For the brake inspection and brake maintenance, it is preferable that an outside diameter of the brake shoe 11 may be manually adjusted. That is, if the brake drum is worn off and the lining 11c get in the worn off portion of the brake drum; if the shoe clearance becomes too small; and if the large tensioned shoe return springs 15, 15 makes it difficult to disassemble, the outside diameter of the brake shoe 11 must be smaller, and to return to a vehicle owner, the outside diameter of the brake shoe 11 needs to be expanded to make the shoe clearance smaller so as to improve the feeling of brake operation. Accordingly, in case that the manual adjustment is necessary, a tool may be inserted from outside of the brake device to rotate the toothed ring 26. Then, the conical surface 40d on the adjustment bolt 40 makes an unrotatable clutch engagement by the force of the shoe return springs 15, 15, and the piston head 24 is restricted its rotation by the shoe web 11b. Therefore, the toothed ring 26 practically integrated with the piston body 23 may be rotated to screw out or in, thereby adjusting the outside diameter of the brake shoe 11 as required.

In FIG. 1, if brake operation is conducted when the brake drum (not shown in FIG. 1) rotates in the direction of arrow F and the lining 11c on the brake shoe 11 is worn out, a stroke of the first piston 22 and the adjustment bolt 40, making a irreversible screw engagement with the same, exceeds a backlash between the adjustment bolt 40 and the clutch ring 42 making a reversible screw engagement with the external thread stem 40c of the adjustment bolt 40. There, the clutch ring 42 has a decreased frictional force on the peripheral conical surface 42a, and the urging force of the clutch spring 43 causes the rotation of the clutch ring 42 along a corresponding external thread of the adjustment bolt with slip between the conical surface 42a of the clutch ring 42 and the second conical surface 21f of the cylinder body 21.

Then, if the brake is released, the adjustment bolt 40 together with the first piston 22 moves backward by the spring force of the return springs 15, 15. Here, the backlash at the screw engagement between the adjustment bolt 40 and the clutch ring 42 is extinguished prior to the conical surface 40d of the adjustment bolt 40 abutting against the first conical surface 21e of the cylinder body 21. Then, the conical surface 42a of the clutch ring 42 is prevented from rotating because of the clutch engagement with the second conical surface 21f of the cylinder body 21. Therefore, the adjustment bolt 40 rotates until the conical surface 40d makes the clutch engagement with the first conical surface 21e, thereby advancing the first piston 22 to automatically approximately maintain a constant shoe clearance. If the brake drum is rotating in the opposite direction of arrow F, only the second piston 32 advances after the lining 11c abuts against the brake drum, which does not give a great effect on automatic shoe clearance adjustment mechanism.

If air is contained inside the cylinder devices 20, 20, the air is compressed resulting an increase in the operation stroke and a sponge effect giving uncomfortable brake feeling to a driver. Therefore, especially at the garage service, complete and quick air bleeding service is required.

In FIGS. 2 and 3, if the brake fluid is fed to pressurize the fluid chamber 20a at the bottom side of one cylinder bore 21a, the brake fluid spirally flows in and along the spiral brake fluid feeding groove 40b and is injected to an internal surface of the back chamber formed between the piston body 23 and the adjustment bolt 40, thereby causing a whirl flow at the back chamber. Therefore, brake fluid is fed within the through duct 40e with air. Further, if the brake fluid is pressurized to begin to advance the first piston 22 together with the adjustment bolt 40 against the force of the shoe return springs 15, 15, the brake fluid is also fed from the gap between the first conical surface 21e of the cylinder body 21 and conical surface 40d of the adjustment bolt 40. Accordingly, while the brake fluid after flowing through the through duct 40f meeting with the brake fluid fed into the through duct 40e at the axial portion, a bleeder provided at the outlet duct (not shown in the figure) leading to the fluid chamber 20a may be released to exhaust the brake fluid with air. This conventional air bleeding required numerous operating steps and was time consuming. The number of operating steps is reduced by agitation of the brake fluid to be realized by the whirl flow of the brake fluid resulting in an effective air bleeding. In addition, air at the further end side of the hollow 32c of the second piston 32 may be pushed to be exhausted by stroking the adjustment bolt 40.

Figure 6:
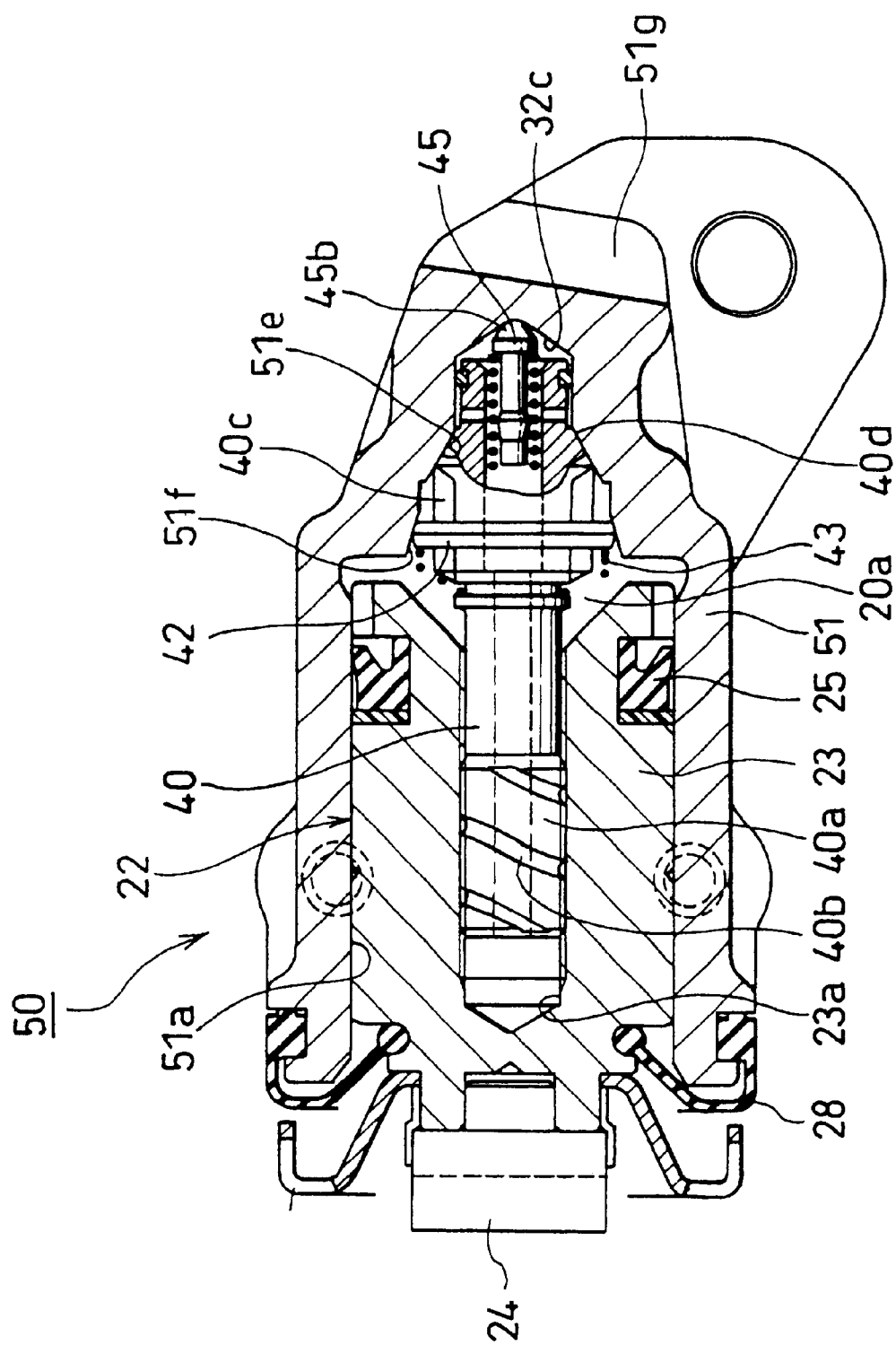
FIG. 6 is a cross-section view of a one-side-open type cylinder device as to Example 2 of this invention.

Example 2 of this invention is explained next with reference to FIG. 6. The example 2 of this invention is an example of cylinder device 50 of one-side-open type employed in a two-leading (2L) type drum brake device.

For examination of Example 2 and any posterior examples, the same reference numbers as in Example 1 will be assigned to identical parts or portions having the same functions as described in Example 1, and the explanation of the structure and the operation regarding the parts or portions will be omitted here.

In Example 2, a cylinder bore 51a with a bottom is formed only at one side of the cylinder body 51, and conical surfaces 51e, 51f compatible to a first conical surface 21e and a second conical surface 21f are formed at the bottom side of the cylinder bore 51a, in which parts equivalent to every part in one cylinder bore 21a of Example 1 are installed. Accordingly, a top of a locator 45 sits on a bottom of the cylinder bore 51a. In addition, a notched groove 51g is formed to support a shoe web of the brake shoe at a right end of the cylinder body 51 in FIG. 6.

Figure 7:
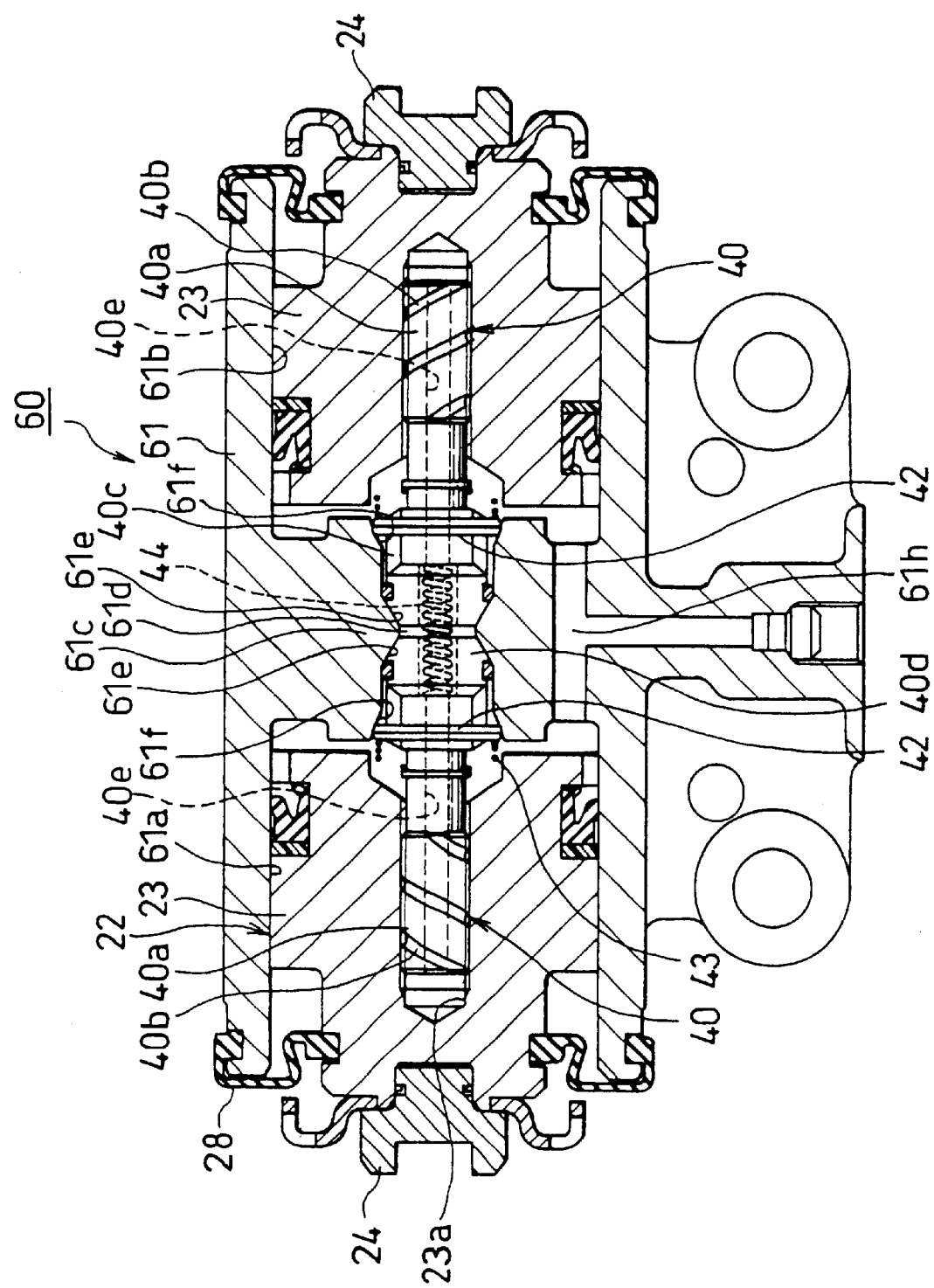
FIG. 7 is a cross-section view of a both-side-open type cylinder device as to Example 3 of this invention.
Figure 8:
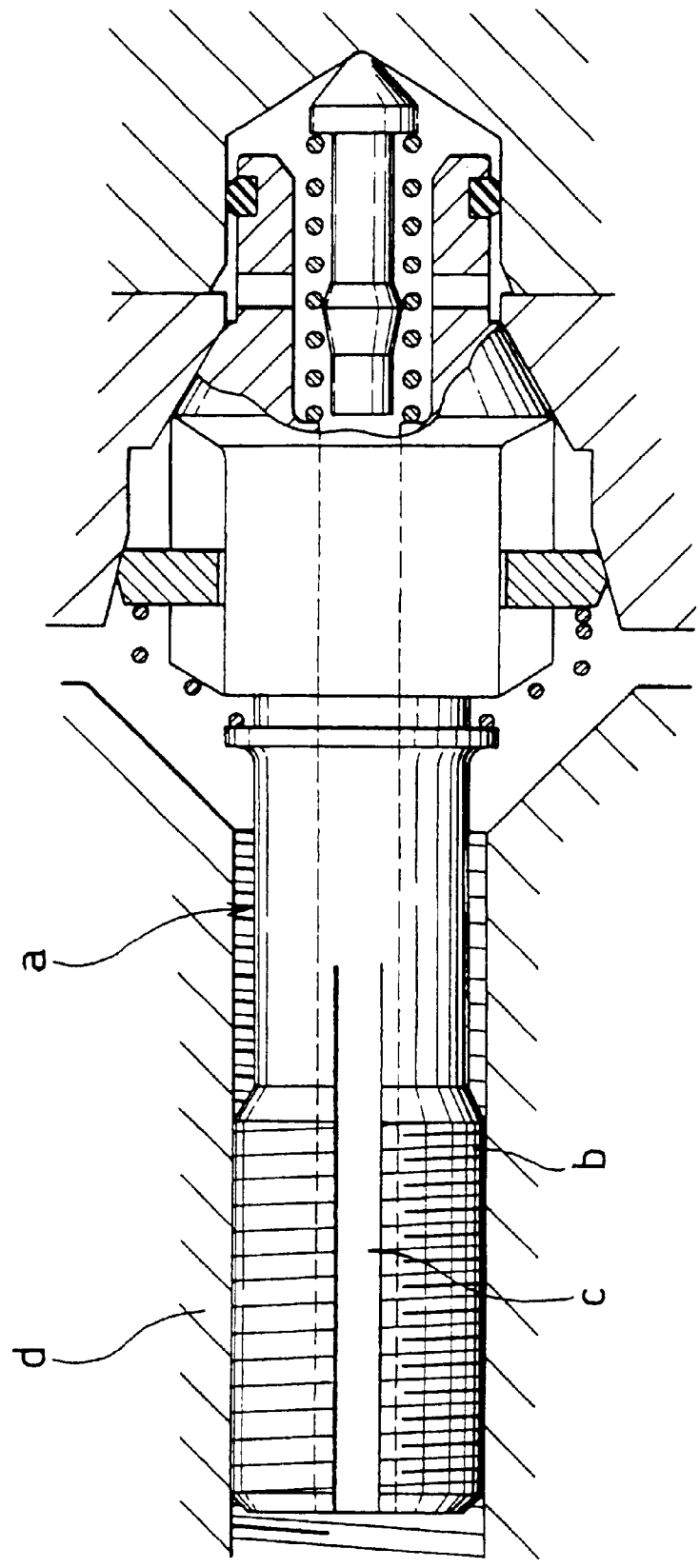
FIG. 8 is an enlarged cross-section view of an automatic shoe clearance adjustment mechanism of the prior art.

Example 3 of this invention is explained next with reference to FIG. 7. Example 3 is an example of a cylinder device 60 of another both-side-open type suitable for a well-known leading trailing (LT) type drum brake device, which may also be employable for aforementioned duo-two-leading (D2L) type drum brake device.

The cylinder device 60 as to Example 3 is bilaterally symmetrical as to parts inside, including an automatic shoe clearance adjustment mechanism like Example 1 at both sides. Accordingly, around a cylinder axis at a partition 61c of a cylinder body 61, a through hole 61d is extended toward both directions and is gradually widened with steps, and first conical surfaces 61e, 61e and second conical surfaces 61f, 6f are formed on an internal surface of the through hole 61d. A fluid channel 61h flowing through both cylinder bores 61a, 61b is raised at the partition 61c adjacent to the through hole 61d. Further, since back ends of the adjustment bolts 40, 40 are designed to axially rectilinearly face each other, common coil spring 44 is compressed in through holes 40e, 40e at axis of the adjustment bolts 40, 40 so as to urge the adjustment bolts 40, 40 slightly toward the piston bodies 23, 23.

In addition, the cylinder devices 20, 20 as described in FIG. 1 of Example 1 are located at an upper and a lower side; however, it is noted that the cylinder devices 20, 50, 60 in Examples 1–3 as to this invention are not limited to position in this manner.

Because of the above-described structure, the brake cylinder device of this invention has the following advantages. A brake fluid feeding groove to be formed on periphery of an external thread stem at one side of the adjustment bolt is designed to be spiral. Therefore, the brake fluid feeding groove and the external thread may be formed by the same processing machine. Accordingly, the time needs to spend and the cost for manufacturing the adjustment bolt may be reduced. A brake fluid feeding groove is designed to be spiral. Therefore, during the rolling process of the external thread, a periphery of a half-finished work of an adjustment bolt smoothly contacts with dies, thereby stabilizing the rotation of the work. Accordingly, no increase in a thread manufacturing tolerance when employing a plastic deform processing by the rolling machine suitable for mass production of external thread, resulting in a stable shoe clearance adjustment.

A brake fluid feeding groove is designed to be spiral, and the brake fluid fed in the feeding groove becomes whirl flow at the back chamber formed between the piston and the adjustment bolt; therefore the brake fluid is agitated, thereby enabling effective exhausting of the brake fluid with air and great improvement of the air bleeding effectiveness.

While the foregoing invention has been shown and described with reference to several preferred embodiments of this invention, it will be understood by those of skill in the art that various changes in form and detail may be made without departing from the spirit and scope of the claimed invention.

What we claim is:

1. A brake cylinder with an automatic shoe clearance adjustment mechanism comprising:

a cylinder body having a cylinder bore extending therein and first and second clutch surfaces inside of the cylinder bore;

a piston, having a hollow with an internal thread, slidably installed in the cylinder bore;

an adjustment bolt, one side of which has a first external thread stem making a screw engagement with the internal thread in the piston preventing the rotation between the two threaded portions by an axial thrust and the other side of which has a clutch surface making a clutch engagement with the first clutch surface on the cylinder bore;

a clutch ring, a axial portion of which has an internal thread making a screw engagement with second external thread stem on the other side of the adjustment bolt with a backlash between the two allowing a rotation of the two threaded portions by an axial thrust while a periphery of which has a co-axial clutch surface making a clutch engagement with the second clutch surface on the cylinder bore;

and a clutch spring energizing the clutch ring in the direction to make the clutch engagement with the second clutch surface on the cylinder bore, wherein a back chamber is formed between the adjustment bolt and the piston, and a spiral brake fluid feeding groove is formed on and entirely covering a periphery of the first external thread stem for feeding a stirring air generated by passing through the spiral brake fluid feeding groove to the back chamber.

2. A brake cylinder as claimed in claim 1, wherein the spiral brake fluid feeding groove is machined by at least one of a rolling machine or a lathe.

3. A brake cylinder as claimed in claim 1, wherein the spiral brake fluid feeding groove is machined by a machine as same as the machine machining an external thread on the external thread stem.

4. A brake cylinder with an automatic shoe clearance adjustment mechanism comprising:

a cylinder body having a cylinder bore extending therein, first and second clutch surfaces inside of the cylinder bore;

a piston, having a hollow with a first internal thread, slidably installed in the cylinder bore;

an adjustment bolt, one end of said bolt has a first external thread stem making a screw engagement with said first internal thread in the piston preventing the rotation between the first internal and the first external threads due to an axial thrust, another end of said bolt has a clutch surface making a first clutch engagement with the first clutch surface on the cylinder bore;

a clutch ring, a central portion of said clutch ring has a second internal thread making a screw engagement with a second external thread stem on another side of the adjustment bolt with a backlash between the clutch ring and the adjustment bolt so as to rotate] allowing a rotation of the second internal and the second external threads by an axial thrust while a periphery of said clutch ring has a co-axial second clutch surface making a second clutch engagement with the second clutch surface on the cylinder bore;

and a clutch spring urging said clutch ring toward said second clutch surface to make the clutch engagement, wherein a back chamber is formed between the adjustment bolt and the piston, and a spiral brake fluid feeding groove is formed on and extends an entire length of the first external thread stem for feeding a stirring air generated by passing through the spiral brake fluid feeding groove to the back chamber.

5. The brake cylinder as claimed in claim 4, wherein the spiral brake fluid feeding groove is machined by at least one of a rolling machine and a lathe.

6. The brake cylinder as claimed in claim 4, wherein the spiral brake fluid feeding groove is machined by a machine as same as the machine machining an external thread on the external thread stem.

* * * * *

UNITED STATES PATENT AND TRADEMARK OFFICE
CERTIFICATE OF CORRECTION

PATENT NO. : 6,454,057 B2
DATED : September 24, 2002
INVENTOR(S) : Furukawa et al.

It is certified that error appears in the above-identified patent and that said Letters Patent is hereby corrected as shown below:

<u>Column 3, line 19, through Column 4, line 9,</u>
Please amend to read as follows:
-- A cylinder device including an automatic shoe clearance adjustment mechanism of this invention, is composed of a piston slidably inserted in a cylinder bore of a cylinder body; an adjustment bolt, one end of which has an external thread stem making an irreversible screw engagement with an internal thread in the piston while the other end of which has a clutch surface making a clutch engagement with a first clutch surface inside of the cylinder bore; a clutch ring having an internal thread formed at an axial portion of which making a reversible engagement with a second external thread stem formed on the other side of the adjustment bolt with a backlash between the two and a peripheral clutch surface making clutch engagement with a second clutch surface inside of the cylinder bore; and a clutch spring energizing the clutch ring in the direction to make the clutch engagement, wherein a back chamber is formed between the adjustment bolt and the piston, and a spiral brake fluid feeding groove is formed on and entirely covering a periphery of the external thread stem for feeding a stirring air generated by passing through the spiral brake fluid feeding groove to the back chamber. Accordingly, this invention provides an advantage in which the cost for manufacturing the adjustment bolt may be reduced and the effectiveness of the air bleeding may be improved. --

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,454,057 B2
DATED : September 24, 2002
INVENTOR(S) : Furukawa et al.

It is certified that error appears in the above-identified patent and that said Letters Patent is hereby corrected as shown below:

Column 2,
Lines 24-44, please amend to read as follows:
-- A cylinder device including an automatic shoe clearance adjustment mechanism of this invention, is composed of a piston slidably inserted in a cylinder bore of a cylinder body; an adjustment bolt, one end of which has an external thread stem making an irreversible screw engagement with an internal thread in the piston while the other end of which has a clutch surface making a clutch engagement with a first clutch surface inside of the cylinder bore; a clutch ring having an internal thread formed at an axial portion of which making a reversible engagement with a second external thread stem formed on the other side of the adjustment bolt with a backlash between the two and a peripheral clutch surface making clutch engagement with a second clutch surface inside of the cylinder bore; and a clutch spring energizing the clutch ring in the direction to make the clutch engagement, wherein a back chamber is formed between the adjustment bolt and the piston, and a spiral brake fluid feeding groove is formed on and entirely covering a periphery of the external thread stem for feeding a stirring air generated by passing through the spiral brake fluid feeding groove to the back chamber. Accordingly, this invention provides an advantage in which the cost for manufacturing the adjustment bolt may be reduced and the effectiveness of the air bleeding may be improved. --.

This certificate supersedes Certificate of Correction issued July 6, 2004.

Signed and Sealed this

Third Day of January, 2006

JON W. DUDAS
*Director of the United States Patent and Trademark Office*